(12) United States Patent
Stapleton (10) Patent No.: US 12,192,334 B2
(45) Date of Patent: *Jan. 7, 2025

(54) DATABASE EXCLUSION (DBX) FOR MULTI-PARTY ACCESS (MPA) TO SENSITIVE PERSONAL INFORMATION (SPI)

(71) Applicant: Wells Fargo Bank, N.A., San Francisco, CA (US)

(72) Inventor: Jeff J. Stapleton, Arlington, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,650

(22) Filed: Sep. 11, 2023

(65) Prior Publication Data

US 2023/0421364 A1 Dec. 28, 2023

Related U.S. Application Data

(63) Continuation of application No. 17/827,200, filed on May 27, 2022, now Pat. No. 11,757,628, which is a continuation of application No. 16/862,281, filed on Apr. 29, 2020, now Pat. No. 11,349,644.

(51) Int. Cl.
*H04L 9/08* (2006.01)
*G06F 21/62* (2013.01)
*H04L 9/14* (2006.01)

(52) U.S. Cl.
CPC ........ *H04L 9/0825* (2013.01); *G06F 21/6218* (2013.01); *H04L 9/0822* (2013.01); *H04L 9/0869* (2013.01); *H04L 9/14* (2013.01)

(58) Field of Classification Search
CPC ... H04L 9/0825; H04L 9/0822; H04L 9/0869; H04L 9/14; G06F 21/6218; G06F 21/6245
See application file for complete search history.

(56) References Cited

U.S. PATENT DOCUMENTS

| | | | |
|---|---|---|---|
| 7,181,017 | B1 | 2/2007 | Nagel et al. |
| 7,469,341 | B2 | 12/2008 | Edgett et al. |
| 10,305,867 | B2 | 5/2019 | Maller et al. |
| 2007/0006322 | A1 | 1/2007 | Karimzadeh et al. |

(Continued)

*Primary Examiner* — Abiy Getachew
(74) *Attorney, Agent, or Firm* — Foley & Lardner LLP (57) ABSTRACT

A system and method for protecting Sensitive Personal Information (SPI) from Multi-Party Access (MPA), including receiving a request for access to a data record, the request comprising an encrypted device identifier identifying the client device, encrypting the data record using a random symmetric key to generate an encrypted data record, encrypting the data record using a second symmetric key to generate a second encrypted data record, the second symmetric key being different from the random symmetric key, encrypting the random symmetric key to generate an encrypted symmetric key by using a public key associated with the client device or a key encryption key associated with the one or more processors, and transmitting a message comprising the encrypted symmetric key and the encrypted device identifier. The message causing the client device to access the data record using a database, the encrypted device identifier, and the encrypted symmetric key.

20 Claims, 5 Drawing Sheets

(56) References Cited

U.S. PATENT DOCUMENTS

| | | |
|---|---|---|
| 2013/0073850 A1 | 3/2013 | Zaverucha |
| 2015/0149771 A1* | 5/2015 | Yen ..................... H04L 9/0637 |
| | | 713/165 |
| 2016/0134594 A1 | 5/2016 | Teo et al. |
| 2016/0357980 A1* | 12/2016 | Balasubramanian ... H04L 63/06 |
| 2018/0248691 A1 | 8/2018 | Henderson et al. |
| 2021/0028933 A1 | 1/2021 | Medvinsky et al. |
| 2021/0344512 A1* | 11/2021 | Xu ..................... H04L 63/168 |

* cited by examiner

500 transmitting, by a client device and to one or more processors, a request for access to a data record that is stored on a first database, the request causing the one or more processors to encrypt the data record using a first symmetric key to generate a first encrypted data record and store the first encrypted data record on a second database that stores a second encrypted data record, the second encrypted data record is generated based on the data record using a second symmetric key
502 receiving, by the client device and from the one or more processors, a message comprising an encrypted symmetric key
504 retrieving, by the client device, the encrypted data record from the second database
506 decrypting, by the client device, the encrypted symmetric key to recover the first symmetric key by using a private key associated with the client device or a key encryption key associated with a public key-private key pair associated with the client device
508 decrypting, by the client device, the encrypted data record using the first symmetric key to recover the data record
510

FIG. 5

DATABASE EXCLUSION (DBX) FOR MULTI-PARTY ACCESS (MPA) TO SENSITIVE PERSONAL INFORMATION (SPI)

CROSS-REFERENCE TO RELATED APPLICATIONS AND CLAIM OF PRIORITY

This application is a continuation of U.S. patent application Ser. No. 17/827,200, entitled "Database Exclusion (DBX) For Multi-Party Access (MPA) to Sensitive Personal Information (SPI)," filed May 27, 2022, which is a continuation of U.S. patent application Ser. No. 16/862,281, entitled "Database Exclusion (DBX) For Multi-Party Access (MPA) to Sensitive Personal Information (SPI)," filed Apr. 29, 2020, now issued as U.S. Pat. No. 11,349,644, the full disclosure of each is incorporated herein by reference in its entirety and for all purposes.

BACKGROUND

Cloud computing is the on-demand availability of computer system resources, especially data storage and computing power, without direct active management by the user. The term is generally used to describe data centers available to many users over the Internet. Large clouds, predominant today, often have functions distributed over multiple locations from central servers. Clouding computing provides the ability to share personal and/or sensitive personal information (SPI).

Personal information includes data that identifies an individual. Full names, home addresses, telephone numbers, birthdays, email addresses, and bank account details all fall under personal information. This is more commonly collected since apps and websites often need these details to run payments or maintain subscriptions. Sensitive Personal Information (SPI) is a type of personal information. If revealed, it can leave an individual vulnerable to discrimination or harassment. Laws protect personal information as a whole, but add extra focus to sensitive information because of possible impacts to a person's livelihood, quality of life, and ability to participate in daily activities.

SUMMARY

Aspects of the present disclosure relate generally to data security technology in the field of cryptography, and more particularly to systems and methods for protecting Sensitive Personal Information (SPI) from Multi-Party Access (MPA).

One aspect disclosed herein is directed to a method for protecting SPI from MPA. In some arrangements, the method includes receiving a request for access to a data record, the request comprising an encrypted device identifier identifying the client device, encrypting the data record using a random symmetric key to generate an encrypted data record, encrypting the data record using a second symmetric key to generate a second encrypted data record, the second symmetric key being different from the random symmetric key, encrypting the random symmetric key to generate an encrypted symmetric key by using a public key associated with the client device or a key encryption key associated with the one or more processors, and transmitting a message comprising the encrypted symmetric key and the encrypted device identifier. The message causing the client device to access the data record using a database, the encrypted device identifier, and the encrypted symmetric key.

In another aspect, the present disclosure is directed to a system for protecting SPI from MPA. In some arrangements, the system includes one or more processors and one or more computer-readable storage mediums storing instructions. The instructions, when executed, by the one or more processors, cause the one or more processors to receive, from a client device, a request for access to a data record, the request comprising an encrypted device identifier identifying the client device, encrypt the data record using a random symmetric key to generate an encrypted data record, encrypt the data record using a second symmetric key to generate a second encrypted data record, the second symmetric key being different from the random symmetric key, encrypt the random symmetric key to generate an encrypted symmetric key by using a public key associated with the client device or a key encryption key associated with the one or more processors, and transmit, to the client device, a message comprising the encrypted symmetric key and the encrypted device identifier. The message causing the client device to access the data record using a database, the encrypted device identifier, and the encrypted symmetric key.

In another aspect, the present disclosure is directed to a non-transitory computer-readable storage medium storing instructions which, when executed by one or more processors, cause the one or more processors to perform operations including receiving, from a client device, a request for access to a data record, the request comprising an encrypted device identifier identifying the client device, encrypting the data record using a random symmetric key to generate an encrypted data record, encrypting the data record using a second symmetric key to generate a second encrypted data record, the second symmetric key being different from the random symmetric key, encrypting the random symmetric key using a public key associated with the client device to generate an encrypted symmetric key, and transmitting, to the client device, a message comprising the encrypted symmetric key and the encrypted device identifier. The message causing the client device to access the data record using a database, the encrypted device identifier, and the encrypted symmetric key.

These and other features, together with the organization and manner of operation thereof, will become apparent from the following detailed description when taken in conjunction with the accompanying drawings.

BRIEF DESCRIPTION OF THE FIGURES

Like reference numbers and designations in the various drawings indicate like elements.

DETAILED DESCRIPTION

Among the many definitions of cloud computing, almost all include the principle of multi-tenancy, or the ability to use the same software and interfaces to configure resources and isolate customer-specific traffic and data. In a typical multi-tenancy environment, multiple users who do not share or see each other's data can share the same applications while running on the same operating system, using the same hardware and the same data storage mechanism.

Multi-tenancy may be a good choice for businesses that want to get started with fewer hardware requirements and easier onboarding. It is also ideal for customers who don't have the internal resources needed to handle the maintenance requirements of single-tenant environment.

A multi-tenant environment, however, leaves multiple access points which could be vulnerabilities to the environment if a cyber-attack occurs. To protect a customer's SPI, most multi-tenant or MPA environments use either a unique data encryption key per party (e.g., client device) with a common master key, or a common data encryption key. In some instances, an MPA environment may use random data encryption key per file with a unique master key per client device. In some instances, an MPA environment may employ dedicated instances per customer, negating many of the benefits of cloud or other hosted services.

Despite the advantages to using an MPA environment, none of the conventional MPA environments are designed to protect the same data element shared with multiple client devices.

Accordingly, the present disclosure is directed to systems and methods for protecting SPI from MPA.

In general, as described in the below passages and specifically in the description of FIG. 1 and FIG. 2, a DBX cryptographic architecture (e.g., DBX system 204 in FIG. 2) may employ a two-tier key hierarchy including symmetric keys and asymmetric keys. A first entity (e.g., client device 212A in FIG. 2, client device 212B in FIG. 2) may generate a public key-private key pair. Data that is permissioned for read-only to the first entity may be encrypted using a random symmetric key and the random symmetric key may be encrypted using the first entity's public key, or encrypted using a key encryption key established using the first entity's public key, such that other entities cannot access the encrypted data provisioned for the first entity. Other entities who have access to the same database but not necessarily the same data cannot access the data unless it is specifically provisioned for that entity. In some arrangements, once an entity has completed its tasks (e.g., retrieving and/or decrypting the data, etc.) the encrypted data and the encrypted symmetric key may be destroyed (e.g., removed, deleted, erased, corrupted, etc.). In some arrangements, as a safeguard, if an entity has not completed its task within the agreed upon timeframe (e.g., minutes, hours, days, weeks, etc.), then the encrypted data and/or the encrypted key may be automatically destroyed. Thus the same data that is provisioned to three separate entities is encrypted three times, each using a random symmetric key, and the associated symmetric key is encrypted using the corresponding entity's public key.

Figure 1:
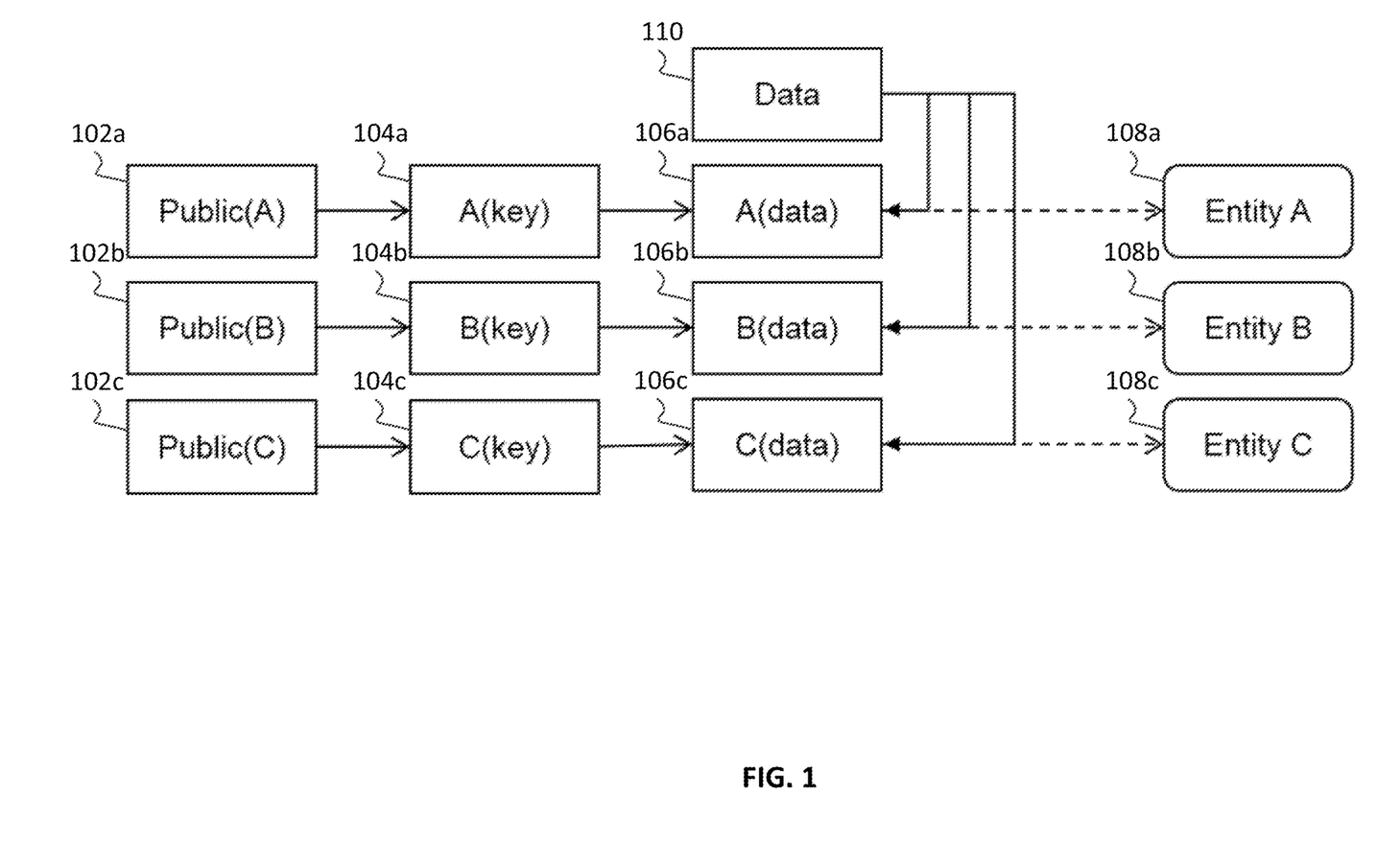
FIG. 1 is a block diagram depicting an example environment of a Database Exclusion (DBX) cryptographic architecture for protecting Sensitive Personal Information (SPI) from MPA, according to some arrangements.

FIG. 1 is a block diagram depicting an example environment of a DBX cryptographic architecture for protecting SPI from MPA, according to some arrangements. The environment 100 includes a first entity 108a (shown in FIG. 1 as, "Entity A") that generates a public key-private key pair associated with the first entity 108a, a second entity 108b (shown in FIG. 1 as, "Entity B") that generates a public key-private key pair associated with the second entity 108b, and a third entity 108c (shown in FIG. 1 as, "Entity C") that generates a public key-private key pair associated with the third entity 108c. The environment 100 includes one or more data records (shown in FIG. 1 as, "Data 110"). Although FIG. 1 shows only a select number of entity devices, it will be appreciated by those skilled in the art that the environment 100 may include many thousands of entity devices that are interconnected in any arrangement to facilitate the exchange of data (e.g., public keys, digital certificates, etc.) between the computing devices.

For the first entity 108a (e.g., entity A) to access the data 110, the data 110 is encrypted using a symmetric key (e.g., a random symmetric key) to generate encrypted data 106a (shown in FIG. 1 as, "A(data)"), and the symmetric key is encrypted using the public key 102a (shown in FIG. 1 as, "Public (A)") of the first entity 108a (e.g., entity A) to generate an encrypted symmetric key 104a (shown in FIG. 1 as, "A(key)").

The first entity 108a (e.g., entity A) can view and/or or process the data 110 in read-only mode by decrypting the encrypted symmetric key 104a using the private key that is associated (e.g., paired, linked, matched, etc.) with the public key 102a of the first entity 108a (e.g., entity A) to recover the symmetric key, and decrypting the encrypted data 106a using the symmetric key to recover the data 110. In some arrangements, once the first entity 108a (e.g., entity A) has completed its task, the encrypted symmetric key 104a and/or the encrypted data 106a may be destroyed. In some arrangements, as a safeguard, if the first entity 108a (e.g., entity A) has not completed its task within the agreed upon timeframe (e.g. minutes, hours, days, weeks), then the encrypted symmetric key 104a and/or the encrypted data 106a may be automatically destroyed.

For the second entity 108b (e.g., entity B) to access the data 110, the data 110 is encrypted using a symmetric key (e.g., a random symmetric key) to generate encrypted data 106b (shown in FIG. 1 as, "B(data)"), and the symmetric key is encrypted using the public key 102b (shown in FIG. 1 as, "Public (B)") of the second entity 108b (e.g., entity B) to generate an encrypted symmetric key 104b (shown in FIG. 1 as, "B(key)").

The second entity 108b (e.g., entity B) can view and/or or process the data 110 in read-only mode by decrypting the encrypted symmetric key 104b using the private key that is associated with the public key 102b of the second entity 108b (e.g., entity B) to recover the symmetric key, and decrypting the encrypted data 106b using the symmetric key to recover the data 110. In some arrangements, once the second entity 108b (e.g., entity B) has completed its task, the encrypted symmetric key 104b and/or the encrypted data 106b may be destroyed. In some arrangements, as a safeguard, if the second entity 108b (e.g., entity B) has not completed its task within the agreed upon timeframe (e.g. minutes, hours, days, weeks), then the encrypted symmetric key 104b and/or the encrypted data 106b may be automatically destroyed.

For the third entity 108c (e.g., entity C) to access the data 110, the data 110 is encrypted using a symmetric key (e.g., a random symmetric key) to generate encrypted data 106c (shown in FIG. 1 as, "C(data)"), and the symmetric key is encrypted using the public key 102c (shown in FIG. 1 as, "Public (C)") of the third entity 108c (e.g., entity C) to generate an encrypted symmetric key 104c (shown in FIG. 1 as, "C(key)").

The third entity 108c (e.g., entity C) can view and/or or process the data 110 in read-only mode by decrypting the encrypted symmetric key 104c using the private key that is associated with the public key 102c of the third entity 108c (e.g., entity C) to recover the symmetric key, and decrypting the encrypted data 106c using the symmetric key to recover the data 110. In some arrangements, once the third entity 108c (e.g., entity C) has completed its task, the encrypted symmetric key 104c and/or the encrypted data 106c may be destroyed. In some arrangements, as a safeguard, if the third entity 108c (e.g., entity C) has not completed its task within the agreed upon timeframe (e.g. minutes, hours, days, weeks), then the encrypted symmetric key 104c and/or the encrypted data 106c may be automatically destroyed.

In some arrangements, the same data may be provisioned to a plurality of entities by using the same random symmetric keys. For example, a DBX cryptographic architecture (e.g., DBX system 204 in FIG. 2) may encrypt the data 110 using a symmetric key (e.g., b14ca589) to generate the encrypted data 106a and the DBX system 204 may encrypt the data 110 using the symmetric key (e.g., b14ca589) to generate the encrypted data 106b. The DBX system 204 may encrypt the symmetric key (e.g., b14ca589) using the public key 102a of the first entity 108a to generate the encrypted symmetric key 104a and the DBX system 204 may encrypt the symmetric key (e.g., b14ca589) using the public key 102b of the second entity 108b to generate the encrypted symmetric key 104b.

In some arrangements, the same data may be provisioned to a plurality of entities by using different random symmetric keys. For example, a DBX cryptographic architecture (e.g., DBX system 204 in FIG. 2) may encrypt the data 110 using a first symmetric key (e.g., b14ca589) to generate the encrypted data 106a and the DBX system 204 may encrypt the data 110 using a second symmetric key (e.g., c53ab211) to generate the encrypted data 106b. The DBX system 204 may encrypt the first symmetric key (e.g., b14ca589) using the public key 102a of the first entity 108a to generate the encrypted symmetric key 104a and the DBX system 204 may encrypt the second symmetric key (e.g., c53ab211) using the public key 102b of the second entity 108b to generate the encrypted symmetric key 104b.

In some arrangements, different data may be provisioned to a plurality of entities by using the same random symmetric keys. For example, a DBX cryptographic architecture (e.g., DBX system 204 in FIG. 2) may encrypt a first data record of data 110 using a symmetric key (e.g., b14ca589) to generate the encrypted data 106a and the DBX system 204 may encrypt a second data record (different from the first data record) using the symmetric key (e.g., b14ca589) to generate the encrypted data 106b. The DBX system 204 may encrypt the symmetric key (e.g., b14ca589) using the public key 102a of the first entity 108a to generate the encrypted symmetric key 104a and the DBX system 204 may encrypt the symmetric key (e.g., b14ca589) using the public key 102b of the second entity 108b to generate the encrypted symmetric key 104b.

In some arrangements, different data may be provisioned to a plurality of entities by using different random symmetric keys. For example, a DBX cryptographic architecture (e.g., DBX system 204 in FIG. 2) may encrypt a first data record of data 110 using a first symmetric key (e.g., b14ca589) to generate the encrypted data 106a and the DBX system 204 may encrypt a second data record (different from the first data record) using a second symmetric key (e.g., c53ab211) to generate the encrypted data 106b. The DBX system 204 may encrypt the first symmetric key (e.g., b14ca589) using the public key 102a of the first entity 108a to generate the encrypted symmetric key 104a and the DBX system 204 may encrypt the second symmetric key (e.g., c53ab211) using the public key 102b of the second entity 108b to generate the encrypted symmetric key 104b.

Figure 2:
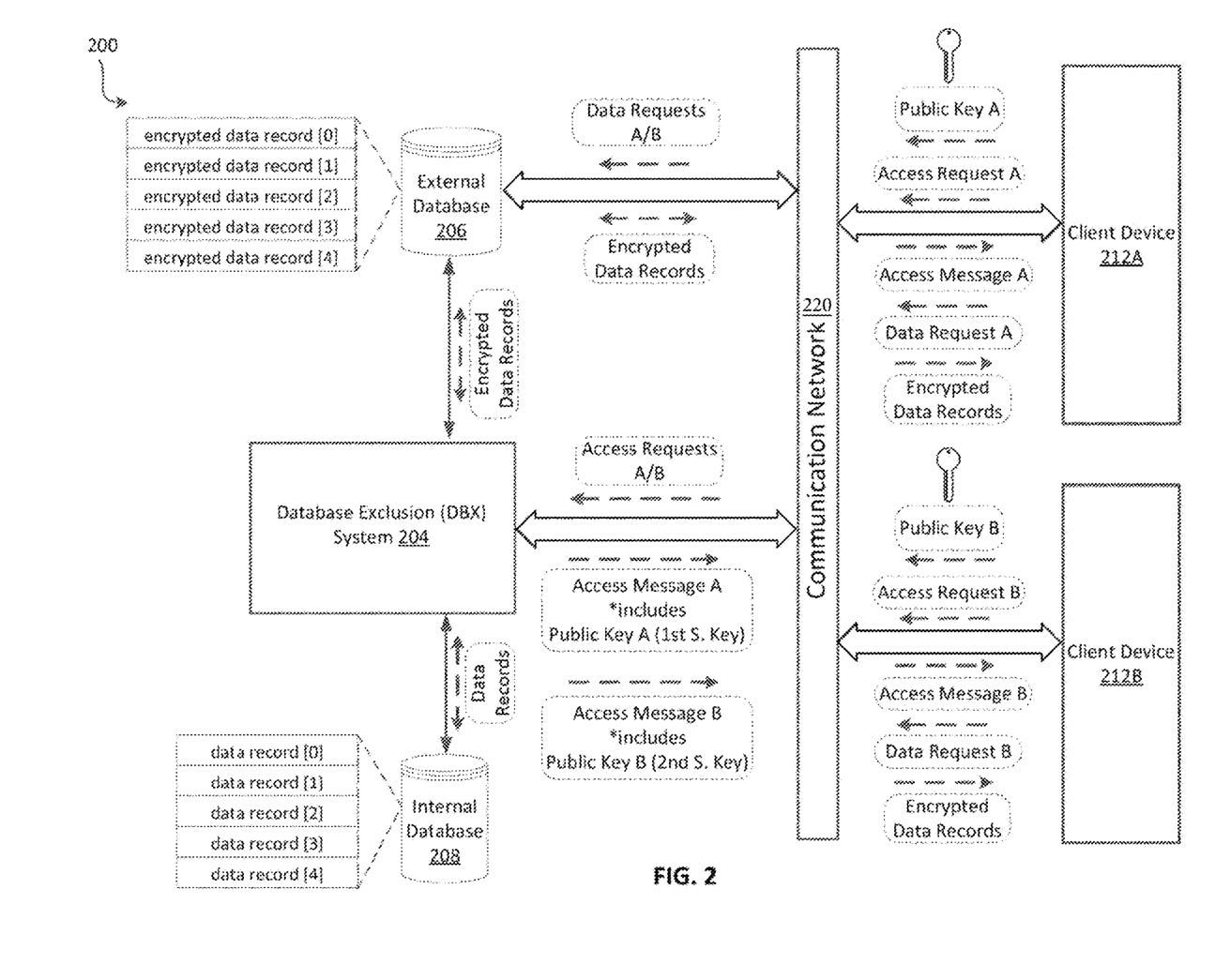
FIG. 2 is a block diagram depicting an example environment of a DBX cryptographic architecture for protecting SPI from MPA, according to some arrangements.

FIG. 2 is a block diagram depicting an example environment of a DBX cryptographic architecture for protecting SPI from MPA, according to some arrangements. The environment 200 may include a DBX system 204 for provisioning one or more data records to be accessed by a client device 212A and/or a client device 212B (collectively referred to as, "client devices 212"). The client devices 212 may be in communication with the DBX system 204 via a communication network 220. The environment 200 may include an internal database 208 for storing one or more data records. The DBX system 204 may be in communication with the internal database 208 via a private communication network (not shown in FIG. 2), in that the internal database 208 is inaccessible (e.g., isolated from) by the client devices 212. The environment 200 may include an external database 206 for storing one or more encrypted data records. The DBX system 204 and the client devices 212 may be in communication with the external database 206 via the communication network 220.

The client devices 212 and the DBX system 204 may each include hardware elements, such as one or more processors, logic devices, or circuits. Although FIG. 2 shows only a select number of computing devices (e.g., client device 212A, client device 212B, and DBX system 204), it will be appreciated by those skilled in the art that the environment 200 may include many thousands of computing devices that are interconnected in any arrangement to facilitate the exchange of data (e.g., public keys, data records, encrypted data records, etc.) between the computing devices.

The communication network 220 may be a local area network (LAN), a wide area network (WAN), a personal area network (PAN), or a combination of these or other networks, that interconnect the computing devices (as discussed herein) and/or databases. Although not illustrated, in many arrangements, the communication network 220 may include one or more intermediary devices, including gateways, routers, firewalls, switches, network accelerators, Wi-Fi access points or hotspots, or other devices. Any of the computing devices and/or the communication network 220 may be configured to support any application layer protocol, including without limitation, Transport Layer Security (TLS), Hypertext Transfer Protocol (HTTP), File Transfer Protocol (FTP), and Secure Shell (SSH).

The internal database 208 includes a plurality of data records and the external database 206 includes a plurality of encrypted data records. The plurality of encrypted data records of the external database 206 correspond to the plurality of data records of the internal database 208. For example, the DBX system 204 retrieves (e.g., fetches, downloads, etc.) the data record [0] from the internal database 208, encrypts the data record [0] using a first symmetric key to generate the encrypted data record [0], and stores the encrypted data record in the external database 206. As another example, the DBX system 204 retrieves the data record [1] from the internal database 208, encrypts the data record [1] using a second symmetric key to generate the encrypted data record [1], and stores the encrypted data record in the external database 206. As another example, the DBX system 204 retrieves the data record [2] from the internal database 208, encrypts the data record [2] using a third symmetric key to generate the encrypted data record [2], and stores the encrypted data record in the external database 206. As another example, the DBX system 204 retrieves the data record [3] from the internal database 208, encrypts the data record [3] using a fourth symmetric key to generate the encrypted data record [3], and stores the encrypted data record in the external database 206. As another example, the DBX system 204 retrieves the data record [4] from the internal database 208, encrypts the data record [4] using a fourth symmetric key to generate the encrypted data record [4], and stores the encrypted data record in the external database 206. As another example, the DBX system 204 retrieves the data record [5] from the internal database 208, encrypts the data record [5] using a fifth symmetric key to generate the encrypted data record [5], and stores the encrypted data record in the external database 206. As discussed herein, any of the symmetric keys (e.g., first symmetric key, second symmetric key, third symmetric key, fourth symmetric key, fifth symmetric key, etc.) may be the same or different symmetric key. Although FIG. 2 shows only a select number of data records that are stored in the internal database 208 and a select number of encrypted data records that are stored in the external database 206, it will be appreciated by those skilled in the art that the internal database 208 and/or the external database 206 may include many thousands of data records and encrypted data records, respectively.

A client device 212 (e.g., client device 212A, client device 212B) may be a computing device that is under the control of a user (or an entity and/or an organization that is associated with the user) and capable of receiving information (e.g., an access message, an encrypted data record, a data request, etc.) and/or sending information (e.g., a public key, an access request, etc.) to/from one or more computing devices (e.g., a DBX system 204, an external database 206, another client device, etc.) over the communication network 220.

A client device 212 (e.g., client device 212A, client device 212B) may be any number of different types of computing devices, including without limitation, a personal computer, a laptop computer, a desktop computer, a mobile computer, a tablet computer, a smart phone, a digital video recorder, a set-top box for a television, a video game console, a digital wallet (also referred to as an "e-Wallet"), or any other type and form of computing device or combinations of devices. In some arrangements, the type of client device 212 may be categorized as a mobile device, a desktop device, a device intended to remain stationary, a device adapted to primarily access a network via a local area network (e.g., communication network 220), or another category of electronic devices such as a media consumption device. The client device 212 may include a user application (e.g., a web browser, an email application, an FTP application) to facilitate the sending and receiving of data over communication network 220.

A client device 212A (e.g., client device 212A, client device 212B) may generate a public key-private key pair that is associated with the client device 212A. For example, the client device 212A may generate a "first" public key-private key pair that is associated with the client device 212A, and the client device 212B may generate a "second" public key-private key pair that is associated with the client device 212B. In some arrangements, the "first" public key-private key pair may be different than the "second" public key-private key pair.

A client device 212A may send an access request (shown in FIG. 2 as, "access request A") to a DBX system 204 for access to one or more data records, causing the DBX system 204 to provision one or more data records for the client device 212A. A client device 212B may send an access request (shown in FIG. 2 as, "access request B") to a DBX system 204 for access to one or more data records, causing the DBX system 204 to provision one or more data records for the client device 212B. In some arrangements, an access request causes the DBX system 204 to retrieve a data record (e.g., data record [0] in FIG. 2) from a first database (e.g., internal database 208), encrypt the data record using a public key (e.g., "public key A" in FIG. 2) that is associated with the client device 212 that sent the access request to generate an encrypted data record (e.g., "encrypted data record [0]" in FIG. 2), and store the encrypted data record in a second database (e.g., external database 206 in FIG. 2).

In some arrangements, a client device 212 may send an access request to the DBX system 204, where the access request includes one or more identifiers (e.g., a public key, a device identifier, etc.) associated with the client device 212. In some arrangements, the sending of the access request by a client device 212 to the DBX system 204 causes the DBX system 204 to retrieve a public key associated with the client device 212 from a database. In some arrangements, the sending of an access request by a client device 212 to the DBX system 204 causes the DBX system 204 to generate a public key that is unique to the client device 212 and store the public key in a database (e.g., internal database 208).

The sending of an access request by a client device 212A to the DBX system 204 may cause the DBX system 204 to send an access message (shown in FIG. 2 as, "access message A") to the client device 212A that includes information (e.g., an encrypted symmetric key, an encrypted data record, and/or an identifier to a database) that the client device 212A may use to access the data record. The sending of an access request by a client device 212B to the DBX system 204 may cause the DBX system 204 to send an access message (shown in FIG. 2 as, "access message B") to the client device 212B that includes information (e.g., an encrypted symmetric key, an encrypted data record, and/or an identifier to a database) that the client device 212B may use to access the data record. For example, an access message may include an encrypted symmetric key that the DBX system 204 generated by encrypting a symmetric key (e.g., shown in FIG. 2 as "1st S. Key") using the public key (e.g., shown in FIG. 2 as, "public key A") associated with the client device 212. As another example, an access message may include an identifier to a database (e.g., external database 206) that stores the encrypted symmetric key. In response to receiving the access message, the client device 212 may retrieve the encrypted symmetric key from the database.

In response to receiving the access message, the client device 212 may retrieve one or more encrypted data records from a database. For example, the client device 212A may send an access request to the DBX system 204 to request access to a data record. The access request may cause the DBX system 204 to retrieve data record [0] from the internal database 208. The access request may cause the DBX system 204 to encrypt the data record [0] using a symmetric key to generate an encrypted data record [0]. The access request may cause the DBX system 204 to store the encrypted data record [0] on the external database 206. The access request may cause the DBX system 204 to encrypt the symmetric key using a public key (e.g., shown in FIG. 2 as, "public key A") associated with the client device 212A to generate an encrypted symmetric key. The access request may cause the DBX system 204 to send an access message to the client device 212A, where the access message includes the encrypted symmetric key. In response to receiving the access message, the client device 212A may decrypt the encrypted symmetric key using a private key associated with the client device 212A to recover the symmetric key. In some arrangements, the private key is associated (e.g., paired, matched, linked, etc.) with a public key (e.g., "public key A" in FIG. 2) of the client device 212A. The client device 212A may retrieve the encrypted symmetric key from the external database 206 and decrypt the encrypted data record [0] using the symmetric key to recover the data record [0].

The DBX system 204 may be a computing device that is capable of receiving information (e.g., a public key, an access request, a data request, a data record, an encrypted data record, etc.) and/or sending information (e.g., a public key, an access message, a data record, an encrypted data record, etc.) to/from one or more computing devices (e.g., a client device 212, an internal database 208, an external database 206, another DBX system 204, etc.) over communication network 220. A DBX system 204 may be any number of different types of computing devices, including without limitation, an application server, a catalog server, a communications server, a computing server, a database server, a file server, a game server, a mail server, a media server, a proxy server, a virtual server, a web server, or any other type and form of computing device or combinations of devices.

The DBX system 204 may receive an access request from a computing device (e.g., client device 212A, client device 212B, etc.) for access to one or more data records. In some arrangements, the access request may include an identifier to one or more data records and/or an identifier to a database (e.g., external database 206). For example, the client device 212A may send an access request to the DBX system 204 for access to data record [0], where the access request does not indicate that data record [0] is stored in internal database 208. As another example, the client device 212A may send an access request to the DBX system 204 for access to data record [0], where the access request indicates that data record [0] is stored on internal database 208. As another example, the client device 212A may send an access request to the DBX system 204 for access to data associated with client device 212A, where the access request does not specifically identify a data record (e.g., data record [0]).

In response to receiving the access request, the DBX system 204 may provision one or more data records for a client device 212 by identifying one or more data records based on the access request. For example, the DBX system 204 may receive an access request from the client device 212A, where the access request includes an identifier to a data record [0]. In response to receiving the access request, the DBX system 204 may determine that the data record [0] is stored in the internal database 208, and retrieve the data record [0] from the internal database 208. As another example, the DBX system 204 may receive an access request from the client device 212A for data associated with the client device 212A. In response to receiving the access request, the DBX system 204 may identify the data record [0] as being associated with the client device 212A and retrieve the data record [0] from the internal database 208.

In response to retrieving a data record from the internal database 208, the DBX system 204 may encrypt the data record using a random symmetric key to generate an encrypted data record and store the encrypted data record in another database that is accessible by the client device 212. For example, the DBX system 204 may retrieve data record [0] from the internal database 208, encrypt the data record (e.g., data record [0]) using a random symmetric key (e.g., shown in FIG. 2 as "1st S. Key") to generate an encrypted data record (e.g., encrypted data record [0]), and store the encrypted data record in external database 206. As another example, the DBX system 204 may retrieve data record [1] from the internal database 208, encrypt the data record (e.g., data record [1]) using a random symmetric key (e.g., shown in FIG. 2 as "2nd S. Key") to generate an encrypted data record (e.g., encrypted data record [1]), and store the encrypted data record in external database 206.

In some arrangements, the DBX system 204 may generate a first random symmetric key (e.g., shown in FIG. 2 as "1st S. Key") for the client device 212A and a second random symmetric key (e.g., shown in FIG. 2 as "2nd S. Key") for the client device 212B, where the first random symmetric key may be the same as the second random symmetric key or the first random symmetric key may be different than the second random symmetric key. In some arrangements, the DBX system 204 may generate a first random symmetric key to encrypt a first data record (e.g., data record [0]) responsive to receiving a first access request from the client device 212A and generate a second random symmetric key to encrypt a second data record (e.g., data record [1]) responsive to receiving a second access request from the client device 212A, where the first random symmetric key may be the same as the second random symmetric key or the first random symmetric key may be different than the second random symmetric key.

In some arrangements, the DBX system 204 may generate a first random symmetric key to encrypt a data record (e.g., data record [0]) responsive to receiving a first access request from the client device 212A and generate a second random symmetric key to encrypt the same data record (e.g., data record [0]) responsive to receiving a second access request from the client device 212A, where the first random symmetric key may be the same as the second random symmetric key or the first random symmetric key may be different than the second random symmetric key.

In some arrangements, the DBX system 204 may retrieve the random symmetric key from a database instead of generating the random symmetric key. In some arrangements, the DBX system 204 may generate a random symmetric key on a periodic basis (e.g., hourly, daily, weekly, monthly, etc.) or on an "on-demand" basis (e.g., upon receiving an access request from a client device 212). In some arrangements, the DBX system 204 may generate a random symmetric key using a pseudorandom number generator (PRNG). In some arrangements, the DBX system 204 may generate a random symmetric key based on the Advanced Encryption Standard (AES).

The DBX system 204 may send (e.g., transmit, deliver, etc.) a message (shown in FIG. 2 as, "access message A") to a client device 212A. The DBX system 204 may send a message (shown in FIG. 2 as, "access message B") to a client device 212B. In some arrangements, the access message may include the encrypted symmetric key, an identifier to a database that stores the encrypted symmetric key, an identifier to one or more encrypted data records, and/or an identifier to a database that stores the one or more encrypted data record.

The sending of the access message to the client device 212 may cause the client device 212 to retrieve an encrypted data record from a database and decrypt the encrypted data record to recover the data record. For example, the sending of the access message to the client device 212A may cause the client device 212A to extract the encrypted symmetric key from the access message. The access message may cause the client device 212A to decrypt the encrypted symmetric key using a private key associated with the client device 212A to recover the symmetric key. In some arrangements, the private key is associated (e.g., paired, matched, linked, etc.) with a public key (e.g., "public key A" in FIG. 2) of the client device 212A. The access message may cause the client device 212A to retrieve an encrypted data record [0] from the external database 206. The access message may cause the client device 212A to decrypt the encrypted data record [0] using the symmetric key to recover the data record [0].

Figure 3A:
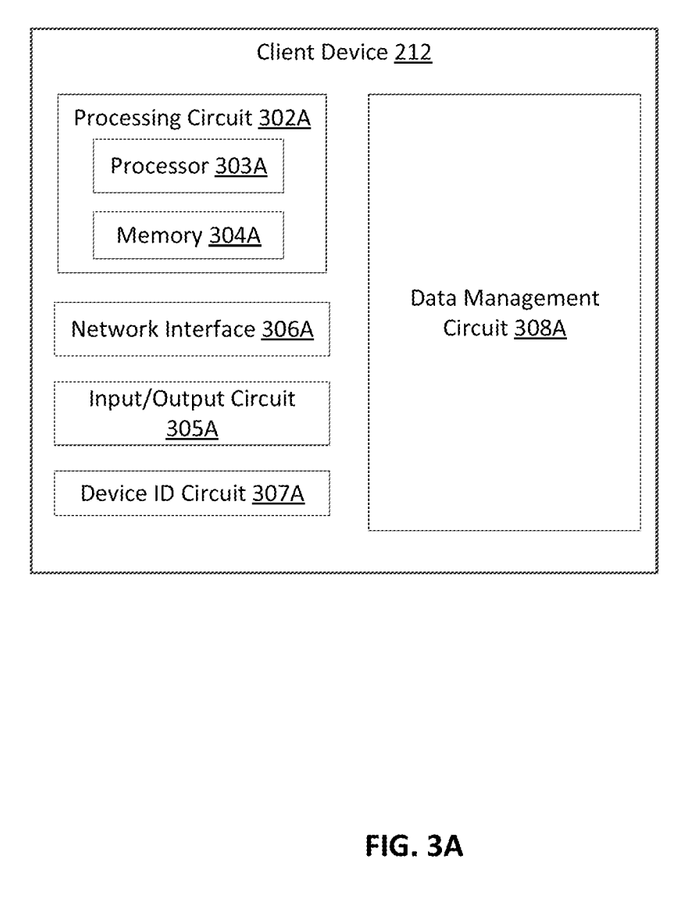
FIG. 3A is a block diagram depicting an example client device 212 of the environment in FIG. 2, according to some arrangements

FIG. 3A is a block diagram depicting an example client device 312 of the environment in FIG. 3, according to some arrangements. While various circuits, interfaces, and logic with particular functionality are shown, it should be understood that the client device 312 includes any number of circuits, interfaces, and logic for facilitating the functions described herein. For example, the activities of multiple circuits may be combined as a single circuit and implemented on a single processing circuit (e.g., processing circuit 302A), as additional circuits with additional functionality are included.

The client device 312 may include a processing circuit 302A composed of one or more processors 303A and a memory 304A. A processor 303A may be implemented as a general-purpose processor, a microprocessor, an Application Specific Integrated Circuit (ASIC), one or more Field Programmable Gate Arrays (FPGAs), a Digital Signal Processor (DSP), a group of processing components, or other suitable electronic processing components. In many arrangements, processor 303A may be a multi-core processor or an array (e.g., one or more) of processors.

The memory 304A (e.g., Random Access Memory (RAM), Read-Only Memory (ROM), Non-volatile RAM (NVRAM), Flash Memory, hard disk storage, optical media, etc.) of processing circuit 302A stores data and/or computer instructions/code for facilitating at least some of the various processes described herein. The memory 304A includes tangible, non-transient volatile memory, or non-volatile memory. The memory 304A stores programming logic (e.g., instructions/code) that, when executed by the processor 303A, controls the operations of the client device 212. In some arrangements, the processor 303A and the memory 304A form various processing circuits described with respect to the client device 212. The instructions include code from any suitable computer programming language such as, but not limited to, C, C++, C #, Java, JavaScript, VBScript, Perl, HTML, XML, Python, TCL, and Basic. In some arrangements (referred to as "headless servers"), the client device 212 may omit the input/output circuit (e.g., input/output circuit 305A), but may communicate with an electronic computing device via a network interface (e.g., network interface 306A).

The client device 212 may include a network interface 306A configured to establish a communication session with a computing device for sending and receiving data over the communication network 220 to the computing device. Accordingly, the network interface 306A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some arrangements, the client device 212 includes a plurality of network interfaces 306A of different types, allowing for connections to a variety of networks, such as local area networks or wide area networks including the Internet, via different subnetworks.

The client device 212 may include an input/output circuit 305A configured to receive user input from and provide information to a user of the client device 212. In this regard, the input/output circuit 305A is structured to exchange data, communications, instructions, etc. with an input/output component of the client device 212. Accordingly, input/output circuit 305A may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the client device 212, such as a built-in display, touch screen, microphone, etc., or external to the housing of the client device 212, such as a monitor connected to the client device 212, a speaker connected to the client device 212, etc., according to various arrangements. In some arrangements, the input/output circuit 305A includes communication circuitry for facilitating the exchange of data, values, messages, and the like between the input/output device and the components of the client device 212. In some arrangements, the input/output circuit 305A includes machine-readable media for facilitating the exchange of information between the input/output device and the components of the client device 212. In still another arrangement, the input/output circuit 305A includes any combination of hardware components (e.g., a touchscreen), communication circuitry, and machine-readable media.

The client device 212 may include a device identification circuit 307A (shown in FIG. 3A as device ID circuit 307A) configured to generate and/or manage a device identifier associated with the client device 212. The device identifier may include any type and form of identification used to distinguish the client device 212 from other computing devices. In some arrangements, a device identifier may be associated with one or more other device identifiers. In some arrangements, to preserve privacy, the device identifier may be cryptographically generated, encrypted, or otherwise obfuscated by any circuit of the client device 212. In some arrangements, the client device 212 may include the device identifier in any communication (any of the messages in FIG. 2, e.g., an access request, etc.) that the client device 212 sends to a computing device.

The client device 212 may include a data management circuit 308A that may be configured to send one or more access requests (e.g., an access request in FIG. 2) to a computing device (e.g., a DBX system 204, another client device 212) for access to a data record. In some arrangements, the access request may include an identifier to the data record (e.g., data record [0], data record [1], etc.), a device identifier associated with the client device 212 and/or a user of the client device 212, and/or an identifier to a database (e.g., internal database 208) where the data record is stored.

The data management circuit 308A may be configured to receive one or more messages (e.g., an access message in FIG. 2) from a computing device (e.g., a DBX system 204, another client device 212). In some arrangements, the access message may include one or more encrypted symmetric keys. In some arrangements, the access message may include an identifier to a database (e.g., external database 206) where one or more encrypted data records that are associated with the encrypted symmetric keys are stored. In some arrangements, the access message may include an identifier to one or more encrypted data records that are associated with the encrypted symmetric keys.

The data management circuit 308A may be configured to extract one or more encrypted symmetric keys from the access message, in response to receiving the access message. In some arrangements, the data management circuit 308A may be configured to extract an identifier to a database (e.g., external database 206) where one or more encrypted data records that are associated with the encrypted symmetric keys are stored. In some arrangements, the data management circuit 308A may be configured to extract an identifier to one or more encrypted data records (e.g., encrypted data record [0], encrypted data record [1]) that are associated with the encrypted symmetric keys.

The data management circuit 308A may be configured to recover a symmetric key from the access message using a private key, in response to receiving the access message. For example, the data management circuit 308A may receive an access message that includes an encrypted symmetric key. The data management circuit 308A may extract the encrypted symmetric key from the access message and decrypt the encrypted symmetric key using a private key associated with client device 212A of the data management circuit 308A to recover a symmetric key. In some arrangements, the private key is associated with a public key (e.g., "public key A" in FIG. 2) of the client device 212A.

The data management circuit 308A may be configured to recover a symmetric key from the access message using a key encryption key, in response to receiving the access message. For example, the data management circuit 308A may receive an access message that includes an encrypted symmetric key. The data management circuit 308A may extract the encrypted symmetric key from the access message and decrypt the encrypted symmetric key using a key encryption key to recover a symmetric key. In some arrangements, the key encryption key is associated with a common secret (sometimes referred to as, "shared secret") that is available (e.g., known, accessible, derivable, discoverable, etc.) to the data management circuit 308A and the DBX system 204.

The data management circuit 308A may be configured to generate the key encryption key. For example, the data management circuit 308A may generate a common secret based on the public key associated with the DBX system 204 and/or a public key-private key pair that is associated with the data management circuit 308A. In some arrangements, the common secret matches a second common secret that is generated by the DBX system 204. The data management circuit 308A may generate the key encryption key based on the common secret.

The data management circuit 308A may be configured to generate the key encryption key based on any key exchange protocol that includes, for example, Rivest-Shamir-Adleman (RSA), Diffie-Hellman (DH), Diffie-Hellman Ephemeral (DHE), Elliptic Curve Diffie-Hellman Ephemeral (ECDHE), and Elliptic Curve Cryptography (ECC)).

In some arrangements, the data management circuit 308A may store the symmetric key in a database and/or in a memory (e.g., memory 304A).

The data management circuit 308A may be configured to fetch (e.g., download, retrieve) one or more encrypted data records from a database. For example, the data management circuit 308A of client device 212A may receive an access message that includes an encrypted symmetric key and an identifier to an encrypted record (e.g., encrypted data record [0]) that is associated with the encrypted symmetric key. The data management circuit 308A may extract the identifier from the access message and fetch the encrypted record (e.g., encrypted data record [0]) from the external database 206 by sending a data request (shown in FIG. 2 as, "data request A") to the external database 206 that includes the identifier, causing the external database 206 to send (or release) the encrypted record (shown in FIG. 2 as, "encrypted data records") to the data management circuit 308A.

The data management circuit 308A may be configured to fetch (e.g., download, retrieve) an encrypted symmetric key from a database using the access message. For example, the data management circuit 308A may receive an access message that includes an identifier to an encrypted symmetric key (e.g., encrypted data record [0]) and a database (e.g., external database 206) that stores the encrypted symmetric key. The data management circuit 308A may fetch the encrypted symmetric key from the database using the identifier.

The data management circuit 308A may be configured to recover a data record from an encrypted data record, in response to receiving the access message. For example, the data management circuit 308A of client device 212A may receive an access message that includes an encrypted symmetric key. The data management circuit 308A may extract the encrypted symmetric key from the access message and decrypt the encrypted symmetric key using a private key associated with the client device 212A of the data management circuit 308A to recover a symmetric key. In some arrangements, the private key is associated with a public key (e.g., "public key A" in FIG. 2) of the client device 212A. The data management circuit 308A may fetch an encrypted symmetric key from a database (e.g., external database 206) and decrypt the encrypted data record using the symmetric key to recover a data record.

The data management circuit 308A may be configured to destroy (e.g., removed, deleted, erased, corrupted, etc.) an access message, an encrypted data record, and/or a data record responsive to receiving a second message from the DBX system 204. For example, the data management circuit 308A of client device 212A may receive a second message from the DBX system 204 that instructs the data management circuit 308A to destroy the access message, an encrypted data record, and/or a data record. In response to receiving the second message, the data management circuit 308A may destroy the access message, the encrypted data record, and/or the data record by removing the access message, the encrypted data record, and/or the data record from a memory location (e.g., memory 304A) associated with the client device 212A. In some arrangements, the data management circuit 308A may send a confirmation message to the DBX system 204 that indicates that the access message, the encrypted data record, and/or the data record have been destroyed.

The data management circuit 308A may be configured to determine an occurrence of a triggering event associated with the client device. In some arrangements, in response to determining an occurrence of a triggering event, the data management circuit 308A may remove one or more encrypted data records from a database. In some arrangements, in response to determining an occurrence of a triggering event, the data management circuit 308A may destroy an encrypted symmetric key or cause a client device 212 to destroy an encrypted symmetric key. For example, the data management circuit 308A may send a message to a client device 212A to destroy an encrypted symmetric key causing the client device 212A to destroy the encrypted symmetric key. In some arrangements, a "triggering event" may be when a client device has completed one or more tasks (e.g., retrieving and/or decrypting one or more encrypted data records, etc.) or not completing the one or more tasks within a predetermined timeframe (e.g., minutes, hours, days, weeks).

The DBX system 204 may include a bus (not shown), such as an address/data bus or other communication mechanism for communicating information, which interconnects circuits and/or subsystems (e.g., data management circuit 308A, device ID circuit 307A, etc.) of the client device. In some arrangements, the client device may 212 include one or more of any such circuits and/or subsystems.

In some arrangements, some or all of the circuits of the client device (e.g., client device 212A, client device 212B) may be implemented with the processing circuit 302A. For example, any of the circuits and/or subsystems (e.g., data management circuit 308A, device ID circuit 307A, etc.) of the client device may be implemented as a software application stored within the memory 304A and executed by the processor 303A. Accordingly, such arrangement can be implemented with minimal or no additional hardware costs. In some arrangements, any of these above-recited circuits rely on dedicated hardware specifically configured for performing operations of the circuit.

Figure 3B:
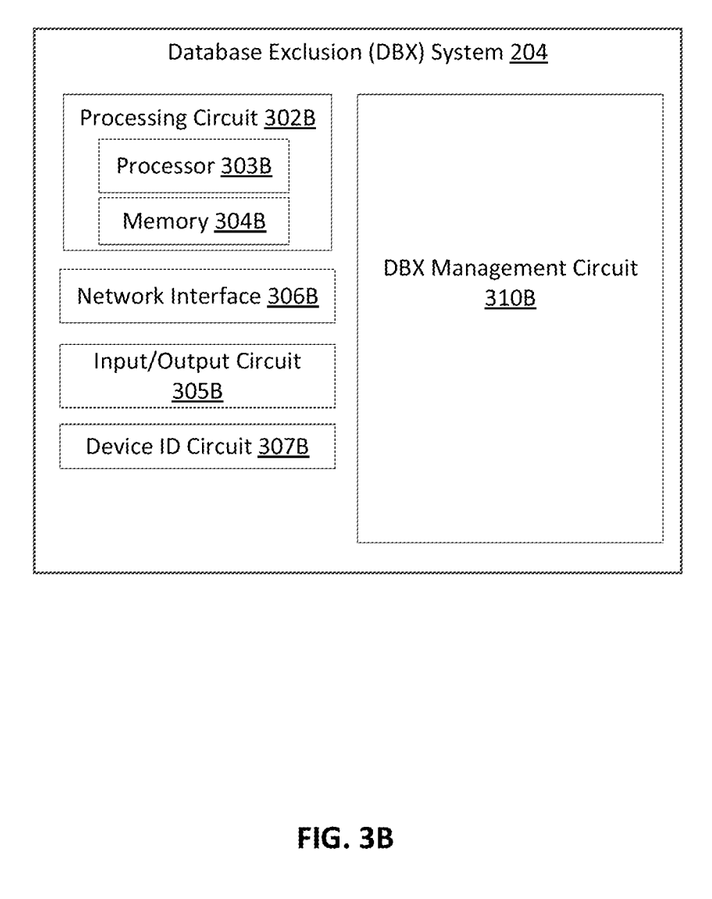
FIG. 3B is a block diagram depicting an example DBX system 204 of the environment in FIG. 2, according to some arrangements

FIG. 3B is a block diagram depicting an example DBX system 204 of the environment in FIG. 2, according to some arrangements. While various circuits, interfaces, and logic with particular functionality are shown, it should be understood that the DBX system 204 includes any number of circuits, interfaces, and logic for facilitating the functions described herein. For example, the activities of multiple circuits may be combined as a single circuit and implemented on a single processing circuit (e.g., processing circuit 302A), as additional circuits with additional functionality are included.

The DBX system 204 may include a processing circuit 302B composed of one or more processors 303A and a memory 304B. The processing circuit 302B includes identical or nearly identical functionality as processing circuit 302A in FIG. 3A, but with respect to circuits and/or subsystems of the DBX system 204 instead of circuits and/or subsystems of the client device 212.

The memory 304B (e.g., Random Access Memory (RAM), Read-Only Memory (ROM), Non-volatile RAM (NVRAM), Flash Memory, hard disk storage, optical media, etc.) of processing circuit 302B stores data and/or computer instructions/code for facilitating at least some of the various processes described herein. The memory 304B includes identical or nearly identical functionality as memory 304A in FIG. 3A, but with respect to circuits and/or subsystems of the DBX system 204 instead of circuits and/or subsystems of the client device 212.

The DBX system 204 may include a network interface 306B configured to establish a communication session with a computing device for sending and receiving data over the communication network 220 to the computing device. Accordingly, the network interface 306B includes identical or nearly identical functionality as network interface 306A in FIG. 3A, but with respect to circuits and/or subsystems of DBX system 204 instead of circuits and/or subsystems of the client device 212.

The DBX system 204 may include an input/output circuit 305B configured to receive user input from and provide information to a user. In this regard, the input/output circuit 305B is structured to exchange data, communications, instructions, etc. with an input/output component of the DBX system 204. The input/output circuit 305B includes identical or nearly identical functionality as input/output circuit 305A in FIG. 3A, but with respect to circuits and/or subsystems of the DBX system 204 instead of circuits and/or subsystems of the client device 212.

The DBX system 204 may include a device identification circuit 307B (shown in FIG. 3B as device ID circuit 307B) configured to generate and/or manage a device identifier associated with the DBX system 204. The device ID circuit 307B includes identical or nearly identical functionality as device ID circuit 307A in FIG. 3A, but with respect to circuits and/or subsystems of the DBX system 204 instead of circuits and/or subsystems of the client device 212.

The DBX system 204 may include a DBX management circuit 310B that may be configured to receive a request (e.g., an access request) from a computing device (e.g., a client device 212, another DBX system 204, etc.) for access to one or more data records. In response to receiving the access request, the DBX management circuit 310B may retrieve one or more data records from a database. For example, the DBX management circuit 310B may receive an access request that includes an identifier to data record [0], determine that the data record [0] is stored in external database 206, and retrieve the data record [0] from the external database 206. In some arrangements, the DBX management circuit 310B may receive a request from a client device (e.g., client device 212A) and in response to receiving the request, retrieve the data record from an internal database (e.g., internal database 208) that is inaccessible by the client device.

The DBX management circuit 310B may be configured to encrypt a data record using a symmetric key to generate an encrypted data record, in response to receiving an access request from a client device 212. For example, the DBX management circuit 310B may retrieve the data record [0] from the internal database 208 and encrypt the data record [0] using a symmetric key to generate an encrypted data record [0].

The DBX management circuit 310B may be configured to store an encrypted data record (e.g., encrypted data record [1]) in a database (e.g., external database 206), in response to receiving an access request from a client device 212.

The DBX management circuit 310B may be configured to encrypt a symmetric key using a public key to generate an encrypted symmetric key, in response to receiving an access request. For example, the DBX management circuit 310B may receive an access request from the client device 212A. In response to receiving the access message, the DBX management circuit 310B may generate a symmetric key and encrypt the symmetric key using a public key that is associated with the client device 212A.

The DBX management circuit 310B may be configured to encrypt a symmetric key using a key encryption key to generate an encrypted symmetric key, in response to receiving an access request. For example, the DBX management circuit 310B may receive an access request from the client device 212A. In response to receiving the access message, the DBX management circuit 310B may generate a symmetric key and encrypt the symmetric key using a key encryption key that is associated with a common secret (sometimes referred to as, "shared secret") that is available (e.g., known, accessible, derivable, discoverable, etc.) to the DBX management circuit 310B and a client device 212.

The DBX management circuit 310B may be configured to generate the key encryption key, in response to receiving an access request. For example, the DBX management circuit 310B may generate a common secret based on the public key associated with the client device and/or a public key-private key pair that is associated with the DBX management circuit 310B. In some arrangements, the common secret matches a second common secret that is generated by a client device.

The DBX management circuit 310B may generate the key encryption key based on the common secret.

The DBX management circuit 310B may be configured to generate the key encryption key based on any key exchange protocol that includes, for example, Rivest-Shamir-Adleman (RSA), Diffie-Hellman (DH), Diffie-Hellman Ephemeral (DHE), Elliptic Curve Diffie-Hellman Ephemeral (ECDHE), and Elliptic Curve Cryptography (ECC)).

In some arrangements, the DBX management circuit 310B may generate the symmetric key using a PRNG to generate a random symmetric key. In some arrangements, the access request may include a public key associated with the client device 212.

The DBX management circuit 310B may be configured to transmit a first message (shown in FIG. 2 as, "access message A") to the client device 212A and/or a second message (shown in FIG. 2 as, "access message B") to the client device 212B. In some arrangements, the first and/or the second message may include an encrypted symmetric key, an identifier to one or more data records, and/or an identifier to a database. In some arrangements, the DBX management circuit 310B may configure the first and/or the second message to cause a client device (upon receiving the message) to fetch an encrypted data record from a database (e.g., external database 206) and decrypt the data record to recover a data record.

The DBX system 204 may include a bus (not shown), such as an address/data bus or other communication mechanism for communicating information, which interconnects circuits and/or subsystems (e.g., DBX management circuit 310B, etc.) of the DBX system 204. In some arrangements, the DBX system 204 may include one or more of any such circuits and/or subsystems.

In some arrangements, some or all of the circuits of the DBX system 204 may be implemented with the processing circuit 302B. For example, any of the DBX system 204 may be implemented as a software application stored within the memory 304B and executed by the processor 303B. Accordingly, such arrangement can be implemented with minimal or no additional hardware costs. In some arrangements, any of these above-recited circuits rely on dedicated hardware specifically configured for performing operations of the circuit.

Figure 4:
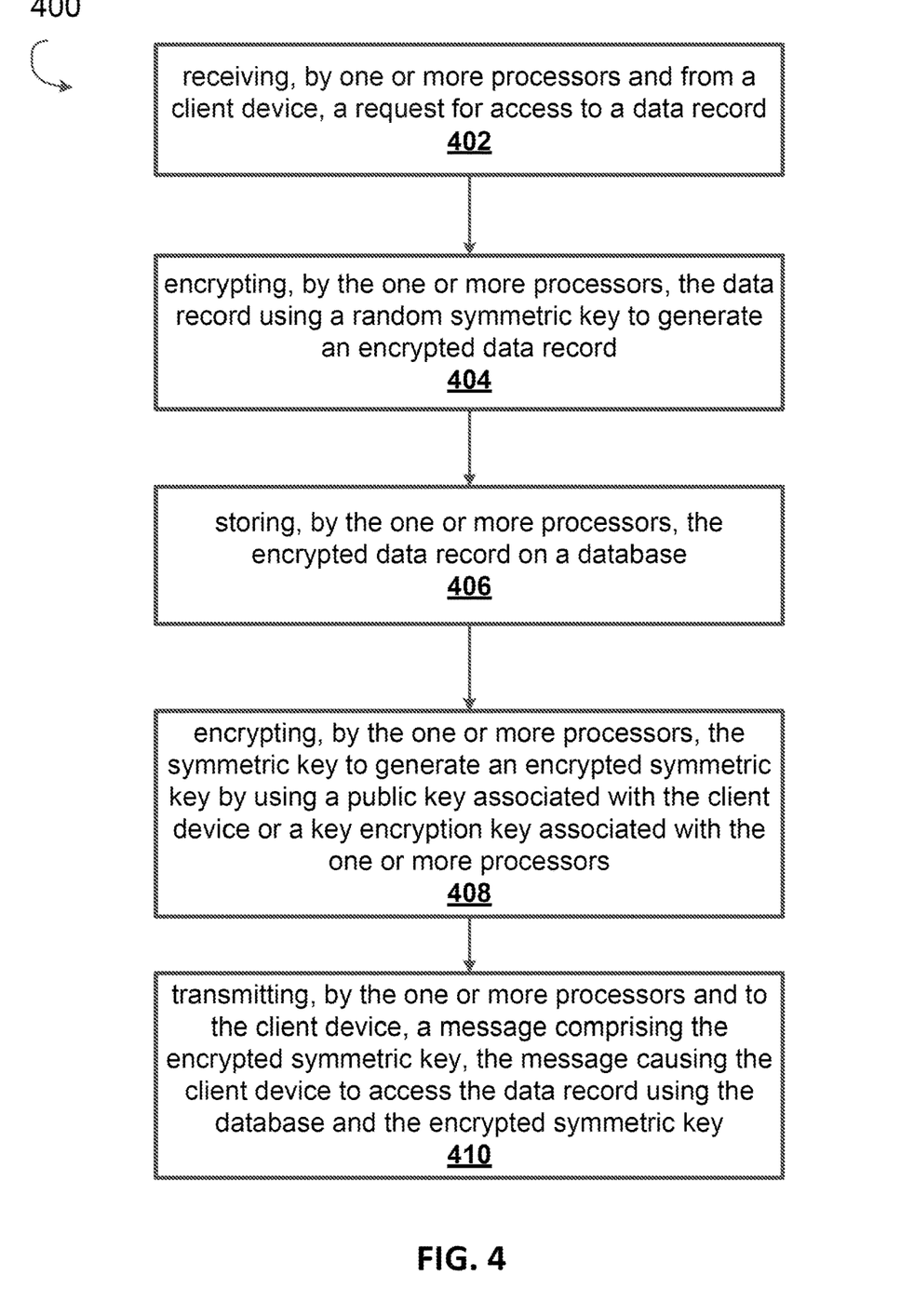
FIG. 4 is a flow diagram depicting a method for protecting SPI from MPA, according to some arrangements.

FIG. 4 is a flow diagram depicting a method for protecting SPI from MPA, according to some arrangements. Additional, fewer, or different operations may be performed in the method depending on the particular arrangement. In some arrangements, some or all operations of method 400 may be performed by one or more processors executing on one or more computing devices, systems, or servers. In some arrangements, method 400 may be performed by one or more database exclusion systems, such as DBX system 204 in FIG. 2. In some arrangements, method 400 may be performed by one or more client devices, such as client device 212 in FIG. 2. Each operation may be re-ordered, added, removed, or repeated.

As shown in FIG. 4, the method 400 includes the operation 402 of receiving, by one or more processors and from a client device, a request for access to a data record. In some arrangements, the method includes the operation 404 of encrypting, by the one or more processors, the data record using a symmetric key to generate an encrypted data record. In some arrangements, the method includes the operation 406 of storing, by the one or more processors, the encrypted data record on a database. In some arrangements, the method includes the operation 408 of encrypting, by the one or more processors, the symmetric key to generate an encrypted symmetric key by using a public key associated with the client device or a key encryption key associated with the one or more processors. In some arrangements, the method includes the operation 410 of transmitting, by the one or more processors and to the client device, a message including the encrypted symmetric key, the message causing the client device to access the data record using the database and the encrypted symmetric key.

Figure 5:
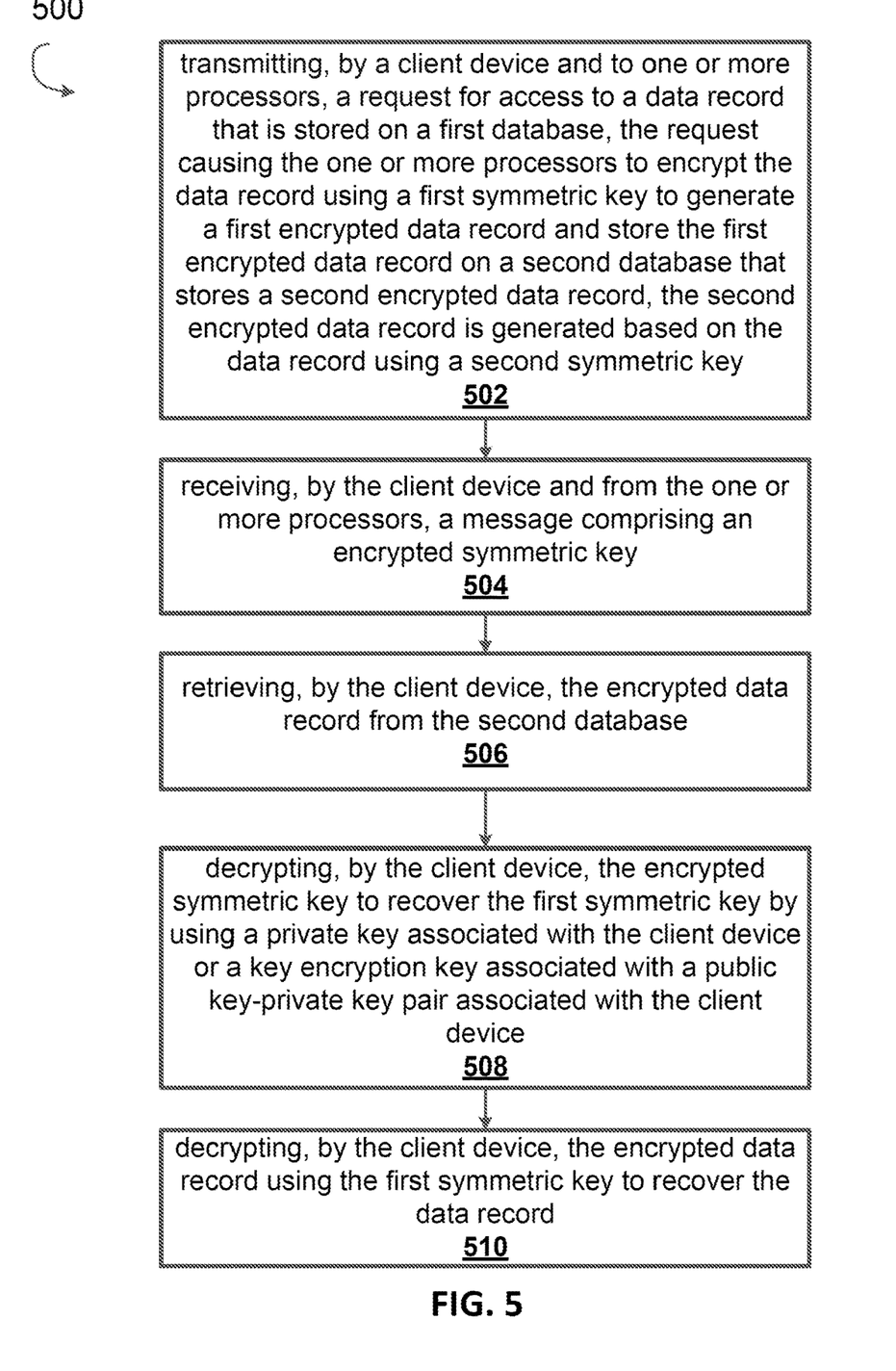
FIG. 5 is a flow diagram depicting a method for protecting SPI from MPA, according to some arrangements.

FIG. 5 is a flow diagram depicting a method for protecting SPI from MPA, according to some arrangements. Additional, fewer, or different operations may be performed in the method depending on the particular arrangement. In some arrangements, some or all operations of method 500 may be performed by one or more processors executing on one or more computing devices, systems, or servers. In some arrangements, method 500 may be performed by one or more database exclusion systems, such as DBX system 204 in FIG. 2. In some arrangements, method 500 may be performed by one or more client devices, such as client device 212 in FIG. 2. Each operation may be re-ordered, added, removed, or repeated.

As shown in FIG. 5, the method 500 includes the operation 502 of transmitting, by a client device and to one or more processors, a request for access to a data record that is stored on a first database, the request causing the one or more processors to encrypt the data record using a first symmetric key to generate a first encrypted data record and store the first encrypted data record on a second database that stores a second encrypted data record, the second encrypted data record is generated based on the data record using a second symmetric key. The method 500 includes the operation 504 of receiving, by the client device and from the one or more processors, a message including an encrypted symmetric key. The method 500 includes the operation 506 of retrieving, by the client device, the encrypted data record from the second database. The method 500 includes the operation 508 of decrypting, by the client device, the encrypted symmetric key to recover the first symmetric key by using a private key associated with the client device or a key encryption key associated with a public key-private key pair associated with the client device. The method 500 includes the operation 510 of decrypting, by the client device, the encrypted data record using the first symmetric key to recover the data record.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Litecoin, Dogecoin, and the like.

It should be noted that although the diagrams herein may show a specific order and composition of method blocks, it is understood that the order of these blocks may differ from what is depicted. For example, two or more blocks may be performed concurrently or with partial concurrence. Also, some method blocks that are performed as discrete blocks may be combined, blocks being performed as a combined block may be separated into discrete blocks, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching blocks, correlation blocks, comparison blocks and decision blocks.

It is also understood that any reference to an element herein using a designation such as "first," "second," and so forth does not generally limit the quantity or order of those elements. Rather, these designations can be used herein as, a convenient means of distinguishing between two or more elements or instances of an element. Thus, a reference to first and second elements does not mean that only two elements can be employed, or that the first element must precede the second element in some manner.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:

transmitting, by a client device and to a system, a request for access to a data record, the request comprising an encrypted device identifier identifying the client device;

receiving, by the client device from the system, a message comprising an encrypted symmetric key and the encrypted device identifier; and in response to receiving the message, accessing, by the client device, the data record using a database, the encrypted device identifier, and the encrypted symmetric key.

2. The method of claim 1, further comprising in response to receiving the message, retrieving, by the client device, the data record from the database.

3. The method of claim 1, wherein the data record is encrypted; and the method further comprising in response to receiving the message, decrypting, by the client device, the encrypted data record using a random symmetric key determined from the encrypted symmetric key.

4. The method of claim 3, wherein the random symmetric key is generated using a pseudorandom number generator (PRNG).

5. The method of claim 1, further comprising in response to receiving the message, discarding, by the client device, an encrypted symmetric key responsive to an elapse of a predetermined window of time.

6. The method of claim 1, wherein the request comprises a public key of the client device.

7. The method of claim 1, wherein an encrypted data record is access by the client device in response to receiving the message;

the data record is stored in a second database prior to the system receiving the request;

the encrypted data record is stored in database in response to the system receiving the request.

8. A client device comprising:

one or more memory devices; and one or more processors configured to:

transmit to a system, a request for access to a data record, the request comprising an encrypted device identifier identifying the client device;

receive a message comprising an encrypted symmetric key and the encrypted device identifier; and in response to receiving the message, access the data record using a database, the encrypted device identifier, and the encrypted symmetric key.

9. The client device of claim 8, the one or more processors further configured to in response to receiving the message, retrieve the data record from the database.

10. The client device of claim 8, wherein the data record is encrypted; and the one or more processors further configured to in response to receiving the message, decrypting, by the client device, the encrypted data record using a random symmetric key determined from the encrypted symmetric key.

11. The client device of claim 10, wherein the random symmetric key is generated using a pseudorandom number generator (PRNG).

12. The client device of claim 8, the one or more processors further configured to in response to receiving the message, discard an encrypted symmetric key responsive to an elapse of a predetermined window of time.

13. The client device of claim 8, wherein the request comprises a public key of the client device.

14. The client device of claim 8, wherein an encrypted data record is access by the client device in response to receiving the message;

the data record is stored in a second database prior to the system receiving the request;

the encrypted data record is stored in database in response to the system receiving the request.

15. At least one non-transitory computer-readable storage medium storing instructions which, when executed by one or more processors, cause the one or more processors to:

transmit to a system, a request for access to a data record, the request comprising an encrypted device identifier identifying the client device;

receive a message comprising an encrypted symmetric key and the encrypted device identifier; and in response to receiving the message, access the data record using a database, the encrypted device identifier, and the encrypted symmetric key.

16. The non-transitory computer-readable storage medium of claim 15, the one or more processors further configured to in response to receiving the message, retrieve the data record from the database.

17. The non-transitory computer-readable storage medium of claim 15, wherein the data record is encrypted; and the one or more processors further caused to in response to receiving the message, decrypting, by the client device, the encrypted data record using a random symmetric key determined from the encrypted symmetric key.

18. The non-transitory computer-readable storage medium of claim 17, wherein the random symmetric key is generated using a pseudorandom number generator (PRNG).

19. The non-transitory computer-readable storage medium of claim 15, the one or more processors further caused to in response to receiving the message, discard an encrypted symmetric key responsive to an elapse of a predetermined window of time.

20. The non-transitory computer-readable storage medium of claim 15, wherein the request comprises a public key of the client device.

* * * * *